United States Patent [19]

Ebata

[11] 4,220,043
[45] Sep. 2, 1980

[54] DEVICE AND METHOD FOR MEASURING THE PROFILE OF A PLATE

[75] Inventor: Sadao Ebata, Okayama, Japan

[73] Assignee: Kawasaki Steel Corporation, Hyogo, Japan

[21] Appl. No.: 966,944

[22] Filed: Dec. 6, 1978

[30] Foreign Application Priority Data

Dec. 8, 1977 [JP] Japan .............................. 52-147962

[51] Int. Cl.³ ..................... G01B 13/12; G01B 13/16; G01B 13/22; G01B 13/24
[52] U.S. Cl. .................................. 73/159; 33/174 P
[58] Field of Search ...................... 73/159, 37.7, 37.6; 72/11, 9; 33/174 P

[56] References Cited

U.S. PATENT DOCUMENTS

| 2,812,447 | 11/1957 | MacMartin | 73/159 |
| 3,340,400 | 9/1967 | Quittner | 73/159 |
| 3,470,739 | 10/1969 | Takafuji | 73/159 |
| 3,509,751 | 5/1970 | Shiraiwa | 73/159 |
| 3,526,114 | 9/1970 | Wistreich | 73/159 |
| 3,850,024 | 11/1974 | Ando | 73/159 |
| 3,850,031 | 11/1974 | Schwenzfeir | 73/159 |
| 3,974,248 | 8/1976 | Atkinson | 73/159 |
| 4,031,741 | 6/1977 | Schaming | 73/37.7 |

Primary Examiner—Gerald Goldberg
Assistant Examiner—Denis E. Corr
Attorney, Agent, or Firm—Koda and Androlia

[57] ABSTRACT

A method and device for measuring a profile of a plate. The device for measuring a profile of a plate includes a plurality of aligned waveshape detectors for detecting a plurality of waveshapes and generating a plurality of waveshape signals, a waveshape processing means for determining signal variation values from the waveshape signals within small periods of time and for summing the signal variation values over a predetermined period of time and subtracting means for comparing the summed signal variation values and for generating outputs corresponding to distortion in the profile of the plate. The method for measuring a profile of a plate includes the steps of detecting the plurality of waveshapes at a plurality of positions aligned with each other in a widthwise direction of the plate, determining signal variation values in the detective waveshapes within short periods of time, summing the signal variation values over a predetermined time and comparing the summed signal variation values with one another whereby distortion of the profile of the plate is measured.

8 Claims, 18 Drawing Figures

PRIOR ART

FIG. 2A  FIG. 2B  FIG. 2C

PRIOR ART

FIG. 3

PRIOR ART

FIG. 4

PRIOR ART

DEVICE AND METHOD FOR MEASURING THE PROFILE OF A PLATE

BACKGROUND OF THE INVENTION

1. Field of the Invention

This invention relates to methods and apparatuses for measuring the profile of a plate and more particularly to methods and apparatuses suitable for electrically measuring distortions such as side end and center extensions occurring in a plate being transferred on a roller table and the like.

2. Prior Art

Differences in rolling conditions take place at the side end portions and the center portions of the surface of a plate and these differences result in distortions in the profile such as side end and center extensions. The distortions in profile refered to herein is a phenomenon in which the amplitudes, frequencies, phases and the like of the waveshapes that occur at the center and side end portions of the plate, respectively, are not equalized. A side end extension refers to a phenomenon in which a side end portion of a plate is more extended than as compared with the center portion and a center extension refers to a phenomenon in which a center portion is more extended as compared to a side end portion.

A plate having such distortions is treated by a straightening machine. However, with this type of treatment, it is difficult to satisfactorily flatten the plate and the result is a lower quality product.

In the prior art, rolling control has been effected which allows straightening of the distortions and flattening the plate during the rolling. Namely, a shape measuring device for measuring distortions in the plate is provided on the outlet side of a rolling mill and the rolling conditions are corrected in response to the shape measuring device so as to reduce distortions in the plate. The shape measurement is made in such a manner that the waveshapes of the center portion and side end portions are detected, respectively, and both waveshapes are compared with each other to thereby measure the differences therebetween.

Heretofore, two methods for detecting the waveshape of a plate have been utilized. The first method is an optical detecting method that includes projectors and receptors provided above a plate and the displacement of the light admitted from the projectors corresponds to the waveshape of the plate. The second method utilizes detectors provided above or below the plate do detect the distances thereinbetween and variations in the distances thus detected correspond to the waveshapes of the plates. Both methods have in common that the outputs for detecting the waveshapes are generated as electrical outputs and these outputs include signal components related to distortion and signal components which do not relate to distortion. The latter signal components are signals which are as a result of vertical motions of the plate as the plate is transferred and the waveshape components are identical in phase, cycle and amplitude with each other at any position in the widthwise direction of the plate. The signal components relating to distortions are only contained in either signal components at the center portion or those at the side end portions and are the desired and important signal components for detecting distortions. In order to measure the distortions from the signal which includes both of these components, it is necessary to remove the signal components which have no relation to distortions. However, in the prior art has been utilized a method for processing the signal components wherein the detected signals are porcessed in the sequential order of rectifying them and then intergrating them. After rectifying and integrating, differences between the signals are measured. However, this method is not desirable because accurate measurement is impossible since only the amplitudes of the detected signals are compared.

Figure 1A:
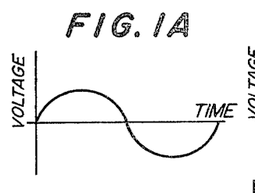
FIGS. 1A, 1B, 1C, 2A, 2B and 2C are explanatory views of waveshapes illustrating the characteristics of conventional method of measuring the profile.
Figure 1B:
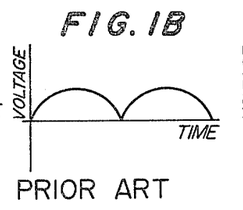
Figure 1C:
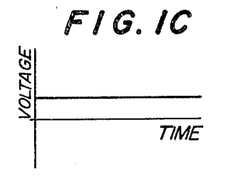
Figure 2A:
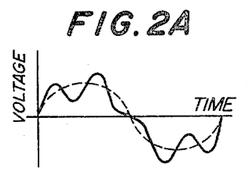
Figure 2B:
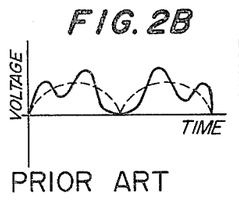
Figure 2C:
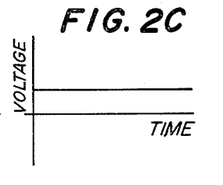

The reasons why accurate measurement is impossible will be hereinunder described. In FIG. 1A is shown the waveshape of the detecting signal of the portion having no distortion. In the Figure time relating to the distance of travel of the plate is the abscissa and a voltage relating to vertical displacement of the plate is the ordinate. FIG. 1B shows the waveshape of the full-wave rectification signal with only the negative components being reversed. FIG. 1C illustrates the waveshape of the signal for the integrated. FIG. 2B shows the waveshape of the detected signal at the portion having distortions and the time relating to the distance in travel of the plate is the abscissa and the vertical displacement of the plate is the ordinate in the same manner as in FIG. 1A. FIG. 2B shows the waveshape of the full-wave rectification signal with only the negative components being reversed. FIG. 2C shows the waveshape of the signal further integrated in the same way as in FIG. 1C. Comparing FIG. 1C and FIG. 2C it is apparent that the rectified and integrated signals are equal to each other even though the waveshapes of the detecting signals are quite different as shown in FIG. 1A and FIG. 2A. Accordingly, any difference between the output signals would be zero. Consequently, according to this conventional method the detected signal is processed in the sequential order or rectification, integration and subtraction, and therefore, if the level of the signal components relating to the distortion is shifted by the signal component not relating to the distortions, then the measurement of the shape may be in error or may become impossible.

In contrast to the first two methods, there also exists a method of detecting the waveshapes of a plate wherein water is injected from a plurality of nozzles which are disposed along the widthwise direction of the plate being transferred continuously and uniformly and the displacement waveshapes of the plate are measured through the values of the electrical resistance of the injected water streams.

Figures 3, 4, 5, 6:
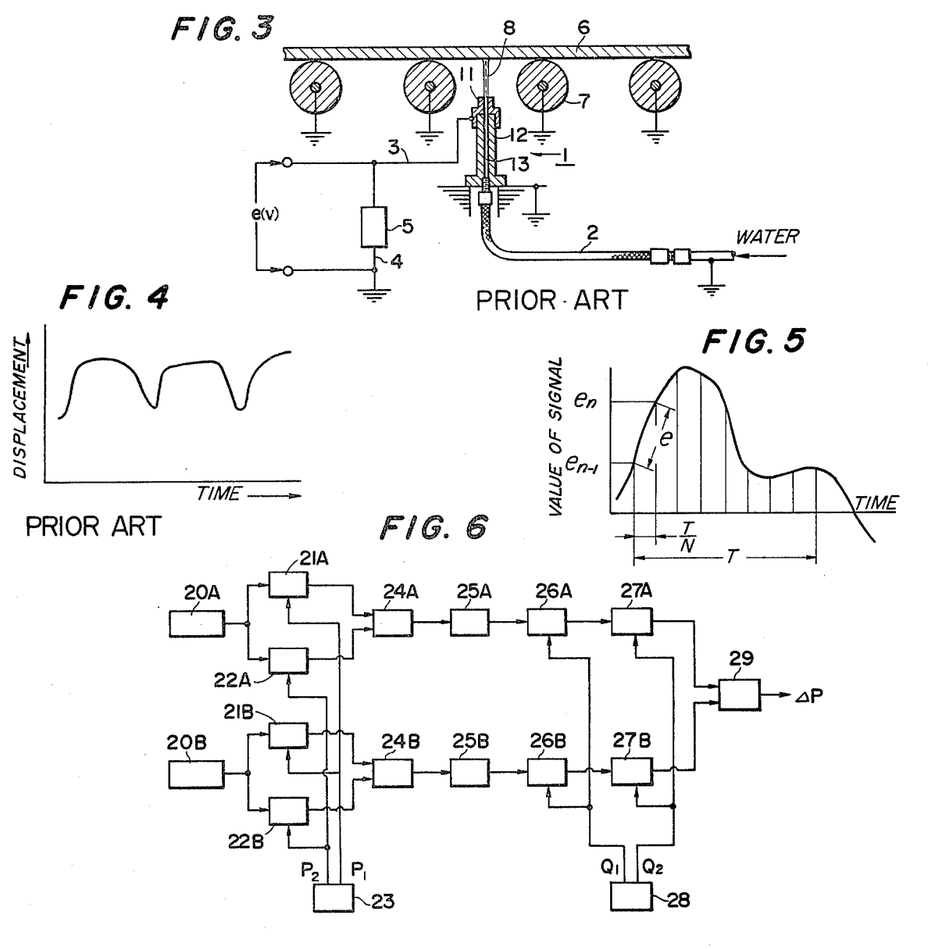
FIG. 3 is a block diagram illustrating a waveshape detecting device for use in the conventional method of measuring a profile.
FIG. 4 is a graph showing the output curve obtained when a flat plate is measured by a conventional waveshape detecting device.
FIG. 5 is an explanatory view illustrating the waveshape detecting signal.
FIG. 6 is a block diagram illustrating one embodiment of an apparatus for measuring the profile in accordance with the teachings of the present invention.

As shown in FIG. 3, the conventional device for detecting the waveshapes comprises a nozzle main body 1, a hose 2, lead wires 3 and 4 and a constant-current power source 5. A plate 6 is continuously transferred on the surface of the roller table 7 at a predetermined speed. The nozzle main body 1 is disposed in opposed relation to the plate 6. The nozzle main body 1 serves to inject water and includes a nozzle tip 11 made of an electrically conductive material and a support member 12 made of insulating material for supporting the nozzle tip 11. Through the central portion of the support member 12 is a hole 13 through which water fed from the hose 2 is led to the nozzle tip 11. The hose 2 is used for feeding water to the nozzle main body 1 and is selected not only for water supply but for an additional function described below. Namely, the inner diameter and length of the hose 2 are so selected that the electrical resistance of the water flowing therethrough is higher than several thousand kilo-ohms and the pressure loss of the water is not more than 1 to 2 kg/cm². In general, the hose 2 selected in accordance with the above requirements is several millimeters in diameter and several meters long.

In electrical arrangement, the output of the constant current power source 5 is provided between the nozzle tip 11 and a ground and the roller table is grounded. Therefore, if water continuously and uniformly injected toward the plate 6 from the nozzle tip 11, the nozzle tip 11 and the plate 6 are electrically connected to each other through an injected water stream 8 (the electrical resistance of water). In this case, current flows along the route from the constant-current power source 5, through the lead wire 3, the nozzle tip 11, the injected water stream 8, the plate 6, the roller table 7, to ground and to the lead wire 4. In addition to this route, the output current of the constant-current power source 5 flows in the route from the lead wire 3, through the nozzle tip 11, the water in the through hole 13, water in the hose 2, a water source (a metal pipe on the side of the water supply of the hose 2 and the like), to ground and to the lead wire 4. From this, it is apparent that the output current from the constant-current power source 5 is the composite value of the current values of both routes.

Because the output current of the constant-current power source 5 is characteristically constant, a voltage is generated between the output terminals of the constant-current power source 5 which is linearly proportional to the composite value in the parallel connection of the values of the electrical resistance of both routes. Most of the resistance in the first route is contained in the injected water stream 8 and the other resistances are very small and are practically negligible. Additionally, most of the electrical resistance in the second route is in the hole 3 and hose 2 and the other resistances are very small and are almost negligible.

Consequently, voltage E between the output terminals of the constant-current power source 5 can be given as follows:

$$E = I \times R_0 \times R_1 / R_0 + R_1 \qquad (1)$$

In the above formula $R_1$ is the value of the electrical resistance of the injected water stream 8, $R_0$ is the value of the electrical resistance of the water in the hole 13 and the hose 2 and I is the predetermined value of the output current of the constant-current power source 5. As it is apparent from the equation (1), if the value of the electrical resistance $R_0$ is assumed to be a constant, then it is apparent that the voltage E between the output terminals of the power source 5 varies depending upon the value of the electrical resistance $R_1$ of the injected water stream 8, i.e. the distance between the nozzle tip 11 and the plate 6. Consequently, the length of the water stream, the distance between the nozzle tip 11 and the plate 6, can be determined from the value of the applied voltage. Additonally, the distortion of the shape of the plate 6 can be calculated from the difference in the values of the voltages between the nozzle tips 11 arranged in parallel to each other in a direction perpendicular to the processing of the plate 6.

The above described prior art detecting device is constructed such that the diameter of the injection port of the nozzle tip 11 is 6 mm and the flow rate of the water stream 8 is 2,200 mm/sec. The flow rate should not be too high because the consumption rate of the water should not be made any larger than is required and the quantity of water being splashed from the plate when the plate is not over the nozzle should be minimized.

The requirements described above have caused few problems in the past when the plate 6 is travelling at a speed which is less than 10,000 mm/sc. However, recently, the travelling speed of the plate has tended to increase so as to increase production. As a result, it has been found that the requirements described above are not sufficient for effectively detecting the distortion over the whole range of the travelling speed.

Namely, in the case where the plate 6 is travelling at a speed beyond some particular speed, if the displacement of the plate travelling at the high rate of speed is detected under the requirements described above, an unusual phenomenon occurs. This phenomenon is that despite the fact that the plate is flat, a signal as shown in FIG. 4 appears, i.e. a signal shape is generated which shows a shape indicating that the plate is poorly flattened. This phenomenon increases as the travelling speed of the plate increases and in some instances detection becomes impossible.

This phenomenon is attributed to an increase in electrical resistance between the water stream 8 and the plate 6 due to the intrusion between the water stream 8 and the plate 6 of an air film attached to the plate 6 and moving around. This phenomenon is known as hydroplaning.

Additionally, in order not to decrease the accuracy of detection when utilizing the detecting device described above, it is essential to keep a constant value of electrical resistance in the hose 2 and to keep a constant value of electrical resistance between the support member 12 and ground. The factors causing the value of electrical resistance in the hose 2 include variations of the electrical conduction of the water and the scale attached to the inner wall of the hose. In particular, the scale on the inner wall of the hose is significant. In general, the water used in this detecting device is not pure water and the impurities dissolved in the water attach to the inner wall of the hose 2 over a long period of time. Due to the attachment of these impurities, the value of the electrical resistance in the hose 2 decreases. Additionally, wetting and contamination of the outer surface of the support member 12 contribute to fluctuations of the electrical resistance between the support member 12 and ground.

Particularly, when using the detecting device described above in a rolling line, the detecting device is subjected to severe conditions wherein water droplets and mill scales are scattered about. In addition, with the nozzle tip 11 having the construction shown in FIG. 3, it is extremely difficult to guarantee the insulation of the support member 12. Hence, the device described above has an additional drawback in that the outer surface of the detecting device must be cleaned frequently. Furthermore, it is possible that things similar to those described above take place on the outer surface of the lead wire 3. Namely, if the outer surface of the lead wire 3 is wetted with water or contaminated, current might flow through the wetted or contaminated portion and flow to ground. If such a situation occurs, then the detecting accuracy of the device will be reduced and a decrease in the insulation will be unavoidable over a long period of time. As a result, the detecting accuracy decreases and eventually fails with time.

SUMMARY OF THE INVENTION

Accordingly, it is a general object of the present invention to provide a method and apparatus for measuring the profile of a plate which obviates errors and failures in the measurement due to signal processing and is capable of measuring the profile with high accuracy.

It is another object of the present invention to provide a method and apparatus for detecting the profile of a plate which is capable of measuring the degree of flatness of the plate with high accuracy even when the plate is travelling at a high rate of speed.

It is a further object of the present invention to provide an apparatus with water injecting nozzles for detecting the profile of a plate which has simplified construction and is capable of providing the required insulating characteristic for the support members for a long period of time.

It is still another object of the present invention to provide an apparatus for detecting the profile of a plate which is capable of maintaining the detecting accuracy at a high level even if the insulation of the support members for the nozzles is lowered.

In accordance with the principles of the present invention, the objects are accomplished by a unique method for measuring a profile of a plate. The method includes the steps of detecting a plurality of waveshapes at a plurality of positions aligned with each other in a widthwise direction of the plate, determining signal variation values in the detective waveshape within short periods of time, summing the signal variation values over a predetermined period of time and comparing the summed signal variation values with one another whereby distortions in the profile of the plate are measured.

Furthermore, the objects are accomplished by a unique device for measuring a profile of a plate including a plurality of aligned waveshape detectors for detecting a plurality of waveshapes and generating a plurality of waveshape signals, a waveshape processing means for determining signal variation values from the waveshape signals within small periods of time and for summing the signal variation values over a predetermined period of time and a subtracting means for comparing the summed signal variation values and for generating outputs corresponding to distortion in the profile of the plate.

Additionally, according to the present invention, as a result of studies made of the diameter of the injection port of the nozzle tip such that the detecting accuracy is not impaired by the hydroplane phenomenon over the range of travelling speeds of a plate which is practically conceivable and the flow rate of a water stream injected from the injection port, water is adapted to be injected in accordance with the following condition:

$$D \times V^{3/2} \geq 63 \times 10^4$$

(provided $D \geq 2$, $V \geq 500$). In the above formula, D is the diameter of the injection ports in mm and V is the flow rate of the water stream in mm/sec. With the above conditions, it is possible to accurately detect the degree of flatness of the plate even when the plate is travelling in a high rate of speed.

Furthermore, according to the present invention, the nozzle of the profile measuring device includes a nozzle tip for injecting water which is supplied with voltage, a support member made of insulating material for supporting the nozzle tip, a case spaced apart from the support member and covering the support member and having an opening adjacent to the nozzle tip and a means for feeding a gas under pressure to the interior of the case. The case is constructed such that the gas under pressure flows between the case and the support member and is caused to flow out of the opening in the case. The gas under pressure constantly flows on the outer surface of the support member and the gas under pressure is caused to flow out of the opening of the case whereby water and mill scales will not enter the opening. As a result, insulating characteristics of the outer surface of the support member can be effectively maintained for a long period of time.

In addition, according to the present invention, a voltage of the same porality and the same magnitude as the voltage applied to the nozzle tip is applied to an insultating member disposed between the nozzle and ground. As a result, the current flowing from the nozzle through a route other than the injected water stream is eliminated.

BRIEF DESCRIPTION OF THE DRAWINGS

The above mentioned features and objects of the present invention will become more apparent with reference to the following description taken in conjunction with the accompanying drawings wherein like reference numerals denote like elements, and in which.

DETAILED DESCRIPTION OF THE INVENTION

The method and apparatus for measuring the profile of a plate in accordance with the teachings of the present invention makes it possible to measure the extent of the waveshapes at the center and side end portions of a plate through comparison. In other words, waveshapes of the portions aligned with one another in the widthwise direction of the plate are electrically detected, respectively, and the signal variation values in the detecting signal waveshapes within small periods of time are summed over desired period of time and compared with one another so as to measure the distortion in the shape electrically. Here, the distortions in profile refer to a phenomenon in which the variations in the waveshape, i.e. in amplitude, frequency, phase and the like, between the center portion and the side end portions are not equal to one another. The phenomenon in which the center portion and the side end portions are curved in the same manner is not regarded as distortions in profile.

In general, basically, the extent of waveshape generated in a plate is quantitatively expressed by a value h/p which is obtained by dividing the amplitude of the waveshape h by a pitch p. However, the borders between the adjacent pitches are not in fact clear and it is impossible to know the borders exactly. Even if the measured value of the distortion in shape is generated as an output per pitch, variations in output value are frequently made when the plate travels at a high speed. Accordingly, at high speed it is impossible to read the exact distortion and use it for control. Hence, it is proper to determine the extent of the waveshape as a mean value obtained by averaging several pitches.

FIG. 5 illustrates the detecting signal waveshape. In FIG. 5 the time relating to the distance travelled by the plate is given as the abscissa and the signal value relating to vertical displacement of the plate is given as the ordinate. If it is assumed that, in the detecting signal waveshape 1, the value $\lambda$ (which is obtained by summing up the signal variation values $\Delta 1$ within small periods of time $\Delta T$ in which a desired time T is divided into N portions) corresponds to the value obtained by summing up the differences in vertical displacement within small sections (in which the length of the plate travelling within a period of time T is divided into N portions). As a result, $\lambda$ approximately corresponds to the average value of the distortion h/p.

The above description is given by the following equation:

$$\lambda = \sum_{n=1}^{N} \Delta l = \sum_{n=1}^{N} | e_n - e_{n-1} | \; \alpha \; \overline{h/p} \quad (2)$$

In the above equation, the signal variation values at the beginning end of the small period of time $\Delta T$ are $e_{n-1}$ and $e_n$, respectively.

As is apparent from the above, the extent of the waveshape generated in the plate can be quantitatively sought by summing up the signal variation values of the detecting signal detecting waveshapes within small periods of time over a predetermined desired time period.

If it is assumed that the values of the detecting signals in the center of the plate are $e_n$ and $e_{n-1}$, respectively, the values sought by summing up the absolute values are differences between $e_n$ and $e_{n-1}$ is $\lambda$. If the respective values obtained at the side end portion are $e'_n$, $e'_{n-1}$ and $\lambda'$, then the profile output signal F can be given by the following equation:

$$F = \lambda - \lambda' = \sum_{n=1}^{N} | e_n - e_{n-1} | - \sum_{n=1}^{N} | e'_n - e'_{n-1} | \quad (3)$$
$$= \sum_{n=1}^{N} | (e_n - e_{n-1}) - (e'_n - e'_{n-1}) |$$

Consequently, if the profile output signal F is detected, then the profile of the plate, i.e. distortions in shape, can be measured.

Description will hereunder be given of one embodiment of a profile measuring device in accordance with the teachings of the present invention.

As shown in FIG. 6, the first embodiment includes two waveshape detecting devices 20A and 20B for detecting waveshapes at two points aligned with each other in the widthwise direction of the plate; two pairs of sample and hold circuits 21A and 22A and 21B and 22B for sampling and holding the output detecting signals from the waveshape detecting devices; a gate pulse oscillator 23 for supplying two types of gate pulses $P_1$ and $P_2$ to the sample and hold circuits; substracting circuits 24A and 24B for substracting the outputs from the sample and hold circuits; full-wave rectifying circuits 25A and 25B for full-wave rectifying the outputs from the substracting circuits; integrating circuits 26A and 26B for integrating the outputs from the full-wave rectifying circuits; a second pair of sample and hold circuits 27A and 27B for sampling and holding the outputs from the integrating circuits 26A and 26B; a gate pulse oscillator 28 for supplying two types of gate pulses $Q_1$ and $Q_2$ to the sample and hold circuits 27A and 27B; and a substracting circuit 29 for substracting the outputs between the sample and hold circuits 27A and 27B.

The waveshape detectors 20A and 20B are provided for electrically detecting the waveshapes, i.e. displacements of the plate. The reason why two waveshape detectors 20A and 20B are required is to symmetrically detect distortions in the shape of the plate. Consequently, the waveshape detector 20A is provided at the center of the plate and the waveshape detector 20B is provided at a side end portion of the plate. For the waveshape detectors 20A and 20B, waveshape detector similar to the conventional type are usable that, as shown in FIG. 3 for example, inject water continuously and uniformly toward the surface of the plate from the plurality of nozzles disposed in the widthwise direction of the travelling plate and measure the displacement of the plate at the positions of injection as values of electric resistance of the injected water streams. However, with the method of water injection used by conventional waveshape detectors, there is a danger that the detection of the shape of the plate may become difficult when the plate travels at a high speed because of the hydroplane phenomenon as described above.

Figure 7:
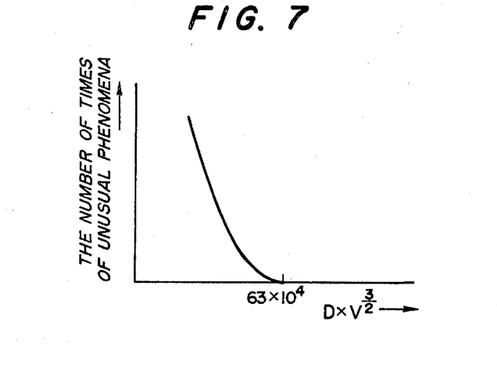
FIG. 7 is a diagram illustrating the effects of the first embodiment of the waveshape detecting device in accordance with the teachings of the present invention.

Consequently, the present invention, based on the results of experiments, as shown in FIG. 7, the hydroplane phenomenon is prevented by injecting water with the relationship between the nozzle diameter and the velocity of the water injected from the nozzles given by the equation $D \times V^{3/2} \geq 63 \times 10^4$ wherein the nozzle diameter is D in mm and the flow rate of water injected from the nozzle V expressed in mm per second. Namely, FIG. 7 is a chart in which the number of times the hydroplanning phenomenon occurs while a flat plate is passed under the nozzles is given as an abscissa and $D \times V^{3/2}$ is given as an ordinate to show the relationship thereinbetween. As is shown from the Figure, if the value of $D \times V^{3/2}$ is made more than $63 \times 10^4$, then no unusual hydroplanning phenomenon occurs. To acquire the data expressed in FIG. 7, the plate was moved past a nozzle at the highest conceivable practical speed. It should be apparent however, that if the speed of the plate is slow, then the curve shown in FIG. 7 would be generally shifted downwardly.

Figure 8:
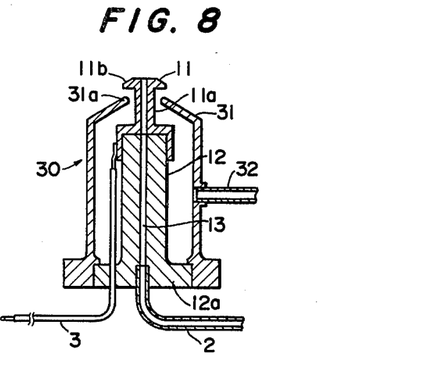
FIG. 8 is a sectional view illustrating a nozzle utilized in the first embodiment of a waveshape detecting device in accordance with the teachings of the present invention.

Referring to FIG. 8, shown therein is a nozzle 30 used in the waveshape detector in accordance with the teachings of the present invention. In FIG. 8, the nozzle includes a nozzle tip 11 made of electrically conducted material for injecting water and applied with a voltage and a support member 12 made of an electrically insulating material for elctrically insulating and supporting the nozzle tip 11. Connected to the support member 12 is a hose 2 for supplying water passing through passage 13 formed in the support member 2. Surrounding the outer periphery of the support member 12 is a case 31 which is provided in spaced apart relationship with both the support member 12 and the nozzle tip 11 and is fixed at the lower end thereof to the flange portion 12a formed at the lower portion of the support member 12. Connected to the case 31 is a piping 32 through which air for purging is supplied from a pressurized air supply source (not shown). The air thus supplied into the case 31 passes through a space between the support member 12 and the case 31 and is blown out of an aperture between the nozzle tip 11 and an opening in the case 31. The air blown out of the space prevents water droplets, mill scales and the like from entering the case 31. In addition, a lead wire 3 for supplying current to the nozzle tip 11 is connected to the nozzle tip 11.

In the embodiment shown in the drawings, the nozzle tip 11 is provided adjacent to the upper end portion thereof with a diametrically narrowed down portion 11a and an umbrella shaped portion 11b and the brim portion 31a of the opening in the case 31 has a slight aperture from the diametrically narrowed down portion 11a. Accordingly, the umbrella shaped portion 11b prevents the falling water droplets, mill scales and the like from entering the case 31 and being attached to the outer surface of the support member 12.

As described above, in the nozzle used in the present invention, the support member 12 is covered by the case 31 and further air for purging is blown out of the aperture between the case 31 and the nozzle tip 11 thereby effetively preventing the water droplets, mill scales and the like from entering the case 31 and attaching to the support member 12.

In addition, in the present embodiment, air is used for purging. However, nitrogen gas and the like may be used in place of air. Furthermore, it would also be possible in some constructions to extend the support member 12 outwardly of the upper end of the case 31 and provide a nozzle tip 11 at the forward end of the portion of the extension of the support member 12. In this configuration gas for purging may be blown out of an aperture between the case 31 and the support member 12 so as to obtain the same effect as described above.

Figure 9:
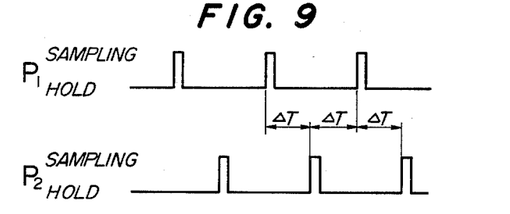
FIGS. 9 and 10 are explanatory views illustrating the action of a sample on hold circuit utilized in the waveshape detecting device in accordance with the teachings of the present invention.

In operation, the output signal from the waveshape detector 20A is fed to the sample and hold circuits 21A and 22A and the output signal of the waveshape detector 20B is fed to the sample and hold circuits 21B and 22B. Furthermore, the gate pulses generated in the gate pulse oscillator 23 are fed to the sample and hold circuits 21A, 21B, 22A and 22B. The gate pulses generated in the gate pulse oscillator 23 includes two types of pulses as shown at $P_1$ and $P_2$ in FIG. 9. The gate pulses $P_1$ and $P_2$ are of the same frequency but shifted in phase by 180° from each other. The gate pulse $P_1$ is used for activating the sample and hold circuits 21A and 21B and the gate pulse $P_2$ is for activating the sample and hold circuits 22A and 22B. Since the frequency of the gate pulses are related to the short time interval $\Delta T$, the frequency of the pulses must be higher than the frequency of the detecting signal, preferably three times greater.

Figure 10:
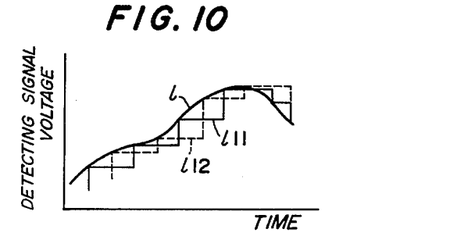

FIG. 10 shows the relationship between the input and output sample and hold circuits 21A and 22A which are actuated by the gate pulses $P_1$ and $P_2$. In FIG. 10, the waveshape 1 indicates the input signal waveshape, $1_{11}$ the output signal waveshape of the sample and hold circuit 21A and $1_{12}$ the output signal waveshape of the sample and hold circuit 22A. The relationship between the waveshapes described above may be similarly applied to the sample and hold circuits 21B and 22B.

Subtraction is made between the outputs of the sample and hold circuits 21A and 22A in the subtracting circuit 24A and the output from the subtracting circuit 24A corresponds to $(e_n - e_{n-1})$ in the equation (2). The output from the subtracting circuit 24A is full-wave rectified in the full-wave rectifying circuit 25A and the output from the full-wave rectifying circuit 25A corresponds to $(e_n - e_{n-1})^2$. The output from the full-wave rectifying circuit 25A is integrated in the integration circuit 26A and the output from the integrated circuit 26A is fed to the sample and hold circuits 27A for sampling and holding. In a similar manner, subtraction is made between the outputs of the sample and hold circuits 21B and 22B in the subtracting circuit 24B and the output from the subtracting circuit 24B is full-wave is full-wave rectified and the full-wave rectifying circuit 25B, integrated in the integration circuit 26B and thereafter fed to the sample and hold circuit 27B.

Figures 11, 12, 13, 14:
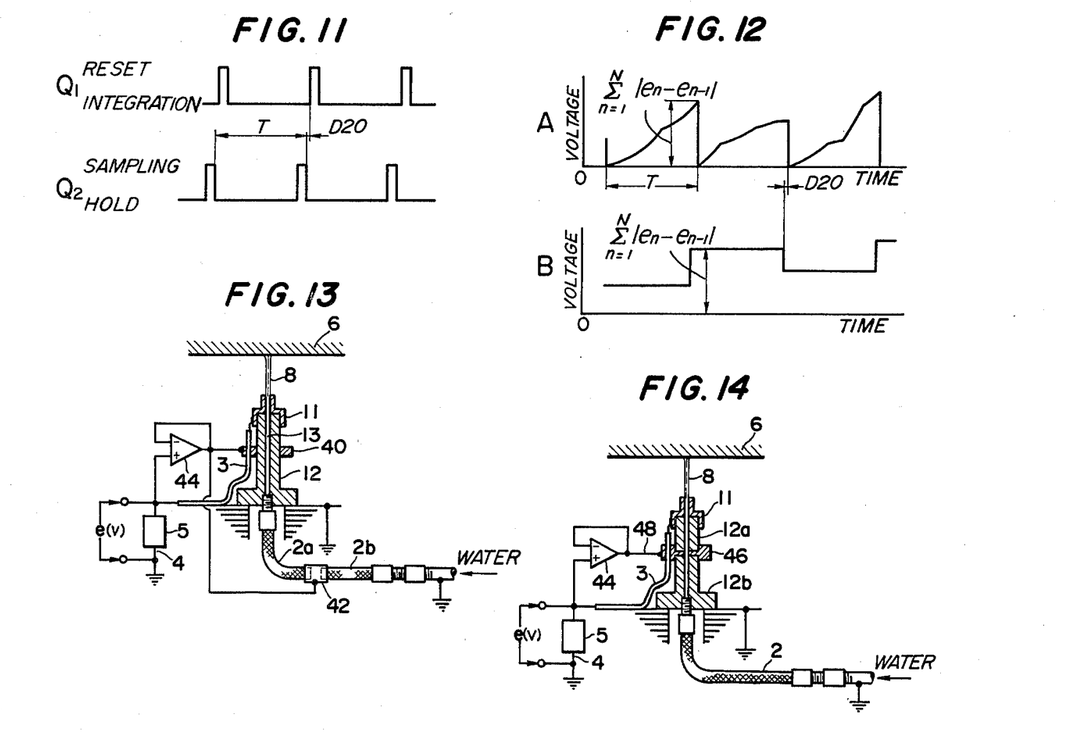
FIG. 11 is a timing chart showing the action of the sample hold circuit at a latter stage.
FIG. 12 is an explanatory view of waveshapes showing the output waveshapes from the integrating circuit and sample in hold circuit.
FIG. 13 is a block diagram illustrating another embodiment of the waveshape detecting device in accordance with the teachings of the present invention.
FIG. 14 is a block diagram illustrating a further embodiment of a waveshape detecting device in accordance with the teachings of the present invention.

The operation of the integrating circuit 26A and 26B and the sample and hold circuits 27A and 27B are controlled by gate pulses $Q_1$ and $Q_2$ generated by the gate pulse oscillator 28 and shown in FIG. 11. The gate pulse $Q_1$ is fed to the integrating circuits 26A and 26B and the gate pulse $Q_2$ is fed to the sample and hold circuits 27A and 27B. When comparing the gate pulses $Q_1$ and $Q_2$, the frequencies of both gate pulses are identical but gate pulse $Q_2$ is slightly advanced over gate pulse $Q_1$. The frequency of the gate pulses $Q_1$ and $Q_2$ correspond to the time for integration and the time for hold. A period of about 0.5 to 2.0 seconds is desirable for the gate pulses $Q_1$ and $Q_2$.

As for the operation of the integrating circuits 26A and 26B, the operation of the integration circuits is effected at the low level and reset is effected at the high level in the gate pulse $Q_1$ shown in FIG. 11. As a result, in the integrated circuit 26A, an integration waveshape corresponding to the gate pulse $Q_1$ shown in FIG. 12 can be obtained. The integration waveshape corresponds to $$\sum_{n=1}^{N} | e_n - e_{n-1} |$$

in the equation (2). The signal is then fed to the sample and hold circuit 27A. As for the operation of the sample and hold circuits 27A and 27B, the operation of holding is effected at a low level and sampling is effected at a high level of the gate pulse $Q_2$ shown in FIG. 11. As a result, in the sample and hold circuit 27A, a stepped type waveshape signal shown in FIG. 12B can be obtained. The level of the signal waveshape corresponds to $$\sum_{n=1}^{N} |e_n - e_{n-1}|$$

in the equation (2). The outputs of the sample and hold circuits 27A and 27B are fed to a subtracting circuit 29 and a subtraction is made between the outputs of the sample and hold circuits 27A and 27B. Suppose an output corresponding to $$\sum_{n=1}^{N} |e_n - e_{n-1}|$$

in the equation (2) appears at the output of the sample and hold circuit 27A and an output corresponding to $$\sum_{n=1}^{N} |e_n - e_{n-1}|$$

in equation (2) appears at the output of the sample and hold circuit 27B, when the subtraction is made between the output of the sample and hold circuits 27A and 27B in the subtracting circuit 29, the shape signal F in equation (3) is obtained. The values of F are measured as voltages ranging from plus to minus, the positive or the negative sign thereof indicating the side end extension or the center extension as a reference and the absolute value thereof indicating the extent. Therefore, if the output from the subtracting circuit 29 is fed to an indicating meter or a recording meter, then the shapes of the distortions of the plate can be indicated or recorded and further, the output can be utilized as an input for controlling correction of the distortions during rolling.

As has been described above, signal variations in the detecting signal waveshape within small periods of time which are summed over a desired period of time are obtained from the detecting signal waveshapes and various points aligned in the widthwise direction of the plate and the results thus obtained are compared with one another to thereby enable one to measure the shape of the distortion of the plate such as the side end extension and the center extension.

Referring to FIG. 13, shown therein is another embodiment of a waveshape detector in accordance with the teachings of the present invention. Since this waveshape detector in some ways are similar to the waveshape detector illustrated and described above, like elements are given like reference numerals and the description of their interconnection in operation will be omitted.

In this embodiment, the nozzle has two points to which voltage is applied respectively. The first point to which voltage is applied is ring 40 made of electrically conductive material provided on the support member 12. The second point to which voltage is applied is a joint 42 interposed between divided parts 2a and 2b of the hose 2. The ring 40 is closely attached to the support member 12 in a manner to surround the support member 12. An insulated or coated lead wire 3 penetrates the ring 40 in such a manner that the ring 40 and the coating of the coated wire 3 are closely attached to each at the penetrating position. If the voltage from the constant current power source 5 is directly applied to the ring 40 and the joint 42, then the accuracy in the detection is decreased due to the current from the points where the voltages are applied. If, a differential amplifier 44 is inserted between the constant current power source and the ring 40 and the joint 42 the problem of a decrease in accuracy of detection is solved. Namely, in the differential amplifier 44, an output terminal and an inverted terminal are connected to each other to form a voltage follower wherein an inverted terminal is made an input terminal and thus the gain of the differential amplifier 44 is 1 and the input impedance is very high. Consequently, for voltages to be applied to the ring 40 and joint 42, a voltage having the same value as that of the constant current power source 5 and the same polarity is obtained. Furthermore, since differential amplifier 44 connected to the constant current source 5 has a high input impedance, the output voltage of the constant current power source 5 is not decreased. As described above, voltages having the same value and polarity as the voltage applied to the tip 11 are applied to the ring 40 and the joint 42 and there is no potential difference at all between the nozzle tip 11 and the ring 40 or between the nozzle tip 11 and the joint 42. Consequently, no electric current flows thereinbetween irrespective of the magnitude in the value of the electric resistance. Namely, the voltages applied to the ring 40 and the joint 42 are determined by use of the differential amplifier 44 so that the electric current which flows from the nozzle tip 11 to the ground through the outer surface of the support member 12 and the lead wire 3 or which flows from the nozzle tip 11 to the water source through the water in the hoses 2A and 2B and the deposits attached to the interiors of the hoses too can be made zero. As the power source for supplying voltages to the ring 40 and the joint 42, the power source for the differential amplifier is utilized and the output from the constant current power source 5 is not utilized. As a result, if the current supplying capacity of the differential amplifier is sufficiently large, there will be no problem provided the electric current from the ring 40 and the joint 42 does not amount to an infinity. Normally, wetting and soiling will result in a current of a few amperes.

According to the above described embodiment, voltages having the same value and polarity as the voltage applied to the nozzle tip 11 are applied to elements interposed between the nozzle tip 11 and ground. As a result, the equivalent resistance between the nozzle tip 11 and ground through alternate path is made effectively infinite. As a result, electric current flowing from the nozzle tip 11 to some other route than the water stream 8 is eliminated. Thereby, it is possible to maintain the accuracy of detection at a high level. In addition, the length of the hoses 2a and 2b may be made shorter and the diameters thereof larger so that water feeding pressure can be decreased.

Referring to FIG. 14, shown therein is a second embodiment of a waveshape detector utilized in the device in accordance with the teachings of the present invention. This third embodiment is somewhat similar to the previously described embodiments and like elements are given like reference numerals and the description of their interconnection in operation is omitted.

In the third embodiment, there is provided only one output terminal for the differential amplifier on the support member, which is advantageous for the provision of an additional detector. As is shown in FIG. 14, the support member 12 is divided into two parts 12a and 12b which are connected to each other by a spacer 46. A lead wire 3 penetrates a peripheral portion of the spacer 46 with the coating or insulation of the lead wire 3 being closely attached to the spacer 46. This spacer 46 is connected to an output terminal of the differential amplifier 44 via a lead wire 48. With the arrangement described above, the potential difference between the nozzle tip 11 and the spacer 46 can be eliminated. If the potential difference is eliminated, the flow of current through a route other than the route from the nozzle tip 11 to the water flow 8 is eliminated. Such an arrangement may be said to have the same function as that of the ring 40 and the joint 42 which are shown in FIG. 13 but put together into one place. As a result with the embodiment shown in FIG. 14, not only can all of the effects of FIG. 13 be obtainable but also the configuration can be generally simplified.

In practice, as the differential amplifier 44, a field effect transistor (FET) input type analog operation element having a very small input current is most suitable because it does not add any disturbance to the detecting signal.

In addition, it should be apparent that while all of the above described waveshape detectors are described in terms of vertical displacement, the types of waveshape detectors used in the device for measuring the profile of a plate described above are not necessarily limited to this construction and other types may be utilized such as optical types which detect inclinations of the plate. While in the above described embodiments the outputs from the full-wave rectifying circuits 25A and 25B are integrated in the integrating circuits 26A and 26B and thereafter compared with each other and subtracting circuits 27A and 27B, it would be possible to perform the integration in the circuits 26A and 26B after the comparison. Additionally, while the devices for measuring the profile of the plate in the above described embodiments are constructed by means of analog process circuits, it would be also possible to use digital processing circuits to produce similar results.

It should be apparent to one skilled in the arts that the above described embodiments are merely illustrative of but a few of the many possible specific embodiments which represent the application of the principles of the present invention. Numerous and varied other arrangements can be readily devised by those skilled in the art without departing from the spirit and scope of the invention.

I claim:

1. A device for measuring the profile of a plate comprising:
   a plurality of aligned waveshape detectors for detecting a plurality of waveshapes and for generating a plurality of waveshape signals, each of said waveshape detectors comprising a plurality of nozzles arranged in a widthwise direction of the plate which injects water continuously and uniformly towards the surface of the plate and vertical displacements of the plate are measured by said waveshape detectors as electrical resistance of the injected water between the nozzles and said plate, each of said nozzles of said waveshape detectors each comprising:
   a nozzle tip for injecting water toward a travelling plate and to which a voltage is applied;
   a support member made of electrically insulated material for supporting said nozzle tip;
   a case spaced apart from said support member and covering said support member and forming at one end an opening adjacent to said nozzle tip;
   a means for feeding gas under pressure to the interior of said case, said case, support member and nozzle tip being arranged and configured such that gas under pressure flows between said case and said support member and is blown out of said opening in said case;
   a waveshape processing means for determining signal variation values from the waveshape signals within small periods of time and for summing the signal variation values over a predetermined period of time; and
   a subtracting means for comparing the summed signal variation values and for generating outputs corresponding to distortion in the profile of the plate.

2. A device for measuring the profile of a plate comprising:
   a plurality of aligned waveshape detectors for detecting a plurality of waveshapes and for generating a plurality of waveshape signals, each of said waveshape detectors comprising a plurality of nozzles arranged in a widthwise direction of the plate which injects water continuously and uniformly towards the surface of the plate and vertical displacements of the plate are measured by said waveshape detectors as electrical resistance of the injected water between the nozzles and said plate, each of said nozzles of said waveshape detectors each comprising:
   a nozzle tip for injecting water toward a travelling plate and to which a voltage is applied;
   a support member made of electrically insulated material for supporting said nozzle tip;
   an electrode portion at an intermediate portion of said support member and a bias voltage is applied to said electrode portion so as to prevent leakage of electric current through another route other than a route from said nozzle to said plate via said injected water;
   a waveshape processing means for determining signal variation values from the waveshape signals within small periods of time and for summing the signal variation values over a predetermined period of time; and
   a subtracting means for comparing the sound signal variation values and for generating outputs corresponding to distortion in the profile of the plate.

3. A device for measuring the profile of a plate according to claim 2 wherein said electrode portion comprises a ring of electrically conductive material around an intermediate portion of said support member.

4. A device for measuring the profile of a plate according to claim 2 wherein said electrode portion is a spacer made of electrically conductive material interposed at an intermediate portion of said support member and dividing said support member into two parts.

5. A device for measuring the profile of a plate comprising:
   a plurality of aligned waveshape detectors for detecting a plurality of waveshapes and for generating a plurality of waveshape signals;
   a waveshape processing means for determining signal variation values from the waveshape signals within small periods of time and for summing the signal variation values over a predetermined period of time, said means for processing waveshapes comprising:
- a pair of first sample and hold circuits provided on each of said waveshape detectors for sampling and holding the output from said waveshape detectors in accordance with the two first gate pulses;
- first subtracting circuits for subtracting the outputs from said first sample and hold circuits;
- integrating circuits for integrating the outputs from said first subtracting circuits; and
- second sample and hold circuits for sampling and holding the output for said first subtracting circuits in accordance with two second gate pulses; and
- a subtracting means for comparing the summed signal variation values and for generating outputs corresponding to distortion in the profile of the plate.

6. A device for measuring the profile of a plate according to claim 5 wherein said first gate pulses have a period less than $\frac{1}{8}$ of period of said waveshape signal, said first gate pulses having an equal period and shifted in phase by 180° from each other.

7. A device for measuring the profile of a plate according to claim 5 wherein said second gate pulses have a period of about 0.5 to 2.0 seconds, said second gate pulses having the same period and being slightly shifted in phase from each other.

8. A device for measuring profile of a plate comprising:
- a plurality of aligned waveshape detectors for detecting a pluarlity of waveshapes and for generating a plurality of waveshape signals, each of said waveshape detectors comprising a plurality of nozzles arranged in widthwise direction of the plate and which inject water continuously and uniformly towards the surface of the plate with the condition that $D \times V^{3/2} \geqq 63 \times 10^4$ with a diameter of the injection is D in mm and the flow rate of the water stream is V in mm/sec and vertical displacements of the plate are measured by said waveshape detectors as electrical resistance of the injected water between the nozzles and said plate, each of said waveshape detectors is further provided with an electrode portion and an intermediate portion of the support member and a bias volatage is supplied to said electrode portions so as to prevent leakage of electric current through another route other than a route from said nozzle to said plate via said injected water;
- a waveshape processing means for determining signal variation values from the waveshape signals within small periods of time and for summing the signal variation values over a predetermined period of time; and
- a subtracting means for comparing the summed signal variation values and for generating outputs corresponding to distortion of the profile of the plate.

* * * * *